United States Patent [11] 3,549,169

| [72] | Inventors | Sidney Oldberg<br>Birmingham;<br>William R. Carey, Farmington, Mich. |
|------|-----------|---|
| [21] | Appl. No. | 765,944 |
| [22] | Filed | Oct. 8, 1968<br>Division of Ser. No. 562,289, July 1, 1966,<br>Pat. No. 3,414,292. |
| [45] | Patented | Dec. 22, 1970 |
| [73] | Assignee | Eaton Yale & Towne Inc.<br>Cleveland, Ohio<br>a corporation of Ohio |

[54] INFLATABLE SAFETY DEVICE
7 Claims, 4 Drawing Figs.

[52] U.S. Cl.......................................... 280/150,
180/103, 200/61.53
[51] Int. Cl.......................................... B60r 21/00
[50] Field of Search.......................................... 280/150,
150(B); 296/84(K); 180/82, 103; 200/61.45,
61.53, 166(L), 168(G); 174/74

[56] References Cited
UNITED STATES PATENTS
| 2,447,749 | 8/1948 | Hallett........................... | (200/166L) |
| 2,850,291 | 9/1958 | Ziccardi........................ | 280/150 |
| 2,477,933 | 8/1949 | Labser........................... | 200/61.53X |
| 2,637,791 | 5/1953 | Bleier............................ | 200/61.53 |
| 2,778,896 | 1/1957 | Tollefsen...................... | (280/150UX) |
| 2,931,665 | 5/1960 | Sandor.......................... | 296/84X |
| 3,197,234 | 7/1965 | Bertrand....................... | 280/150 |
| 3,329,764 | 7/1967 | Tanges.......................... | 174/74 |
| 3,336,045 | 8/1967 | Kobori.......................... | 280/150 |
| 3,337,701 | 8/1967 | Prebilic........................ | 200/61.45 |

*Primary Examiner*—Kenneth H. Betts
*Attorney*—Yount, Flynn & Tarolli

ABSTRACT: An improved vehicle safety apparatus includes a confinement which is inflated from a collapsed condition to an expanded condition to restrain the movement of an occupant of a vehicle during a collision. The confinement is inflated by activation of an explosive charge which opens a reservoir to provide a flow of fluid. The explosive charge is activated by a sensor which includes switch contacts which are closed in response to the vehicle encountering a collision.

PATENTED DEC 22 1970 3,549,169
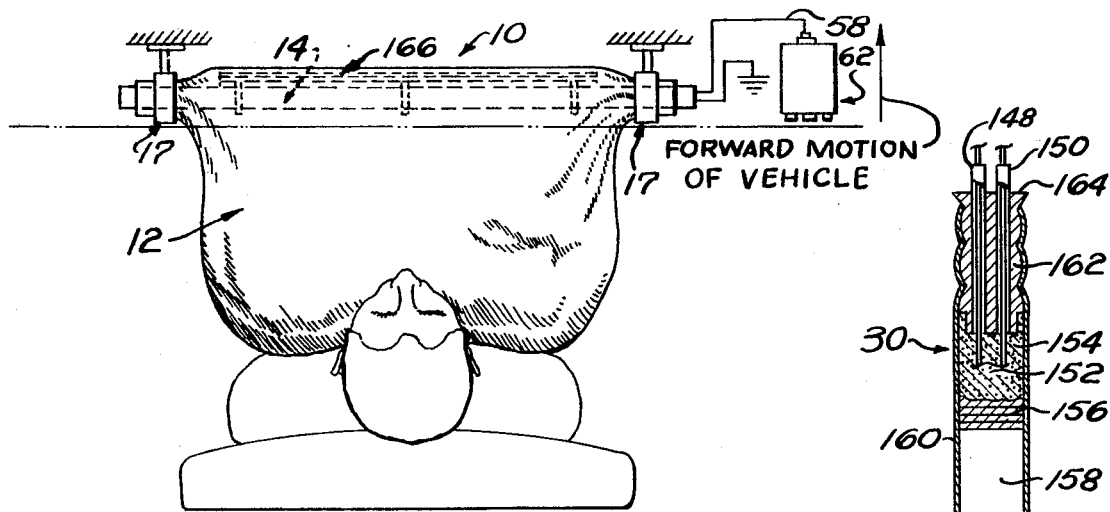
FIG. 1
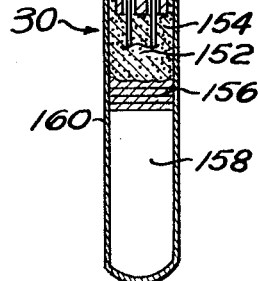
FIG. 4
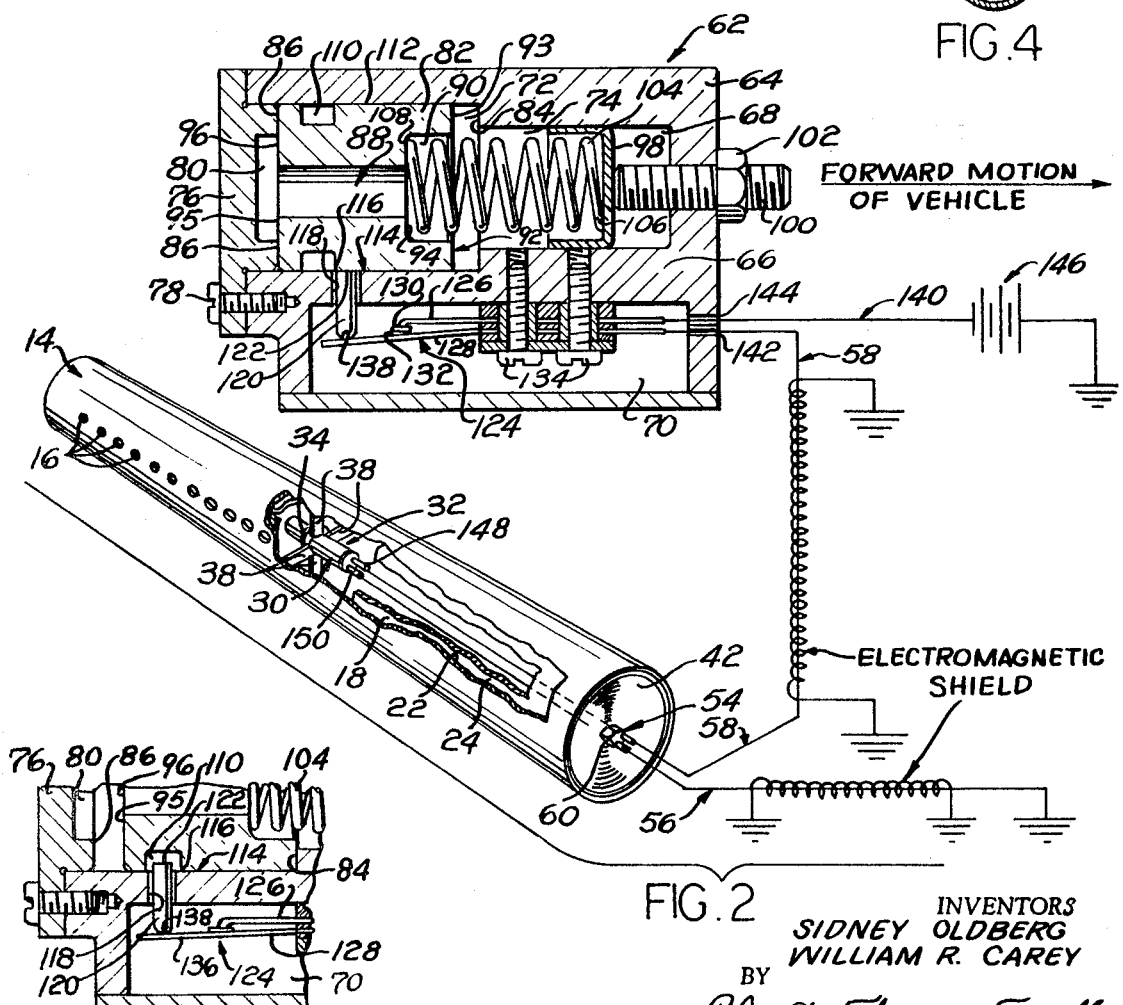
FIG. 2
FIG. 3
INVENTORS
SIDNEY OLDBERG
WILLIAM R. CAREY
BY
Young, Flynn & Tarolli
ATTORNEYS

INFLATABLE SAFETY DEVICE

This application is a divisional application of application Ser. No. 562,289 filed Jul. 1, 1966, now U.S. Pat. No. 3,414,292.

This invention relates to an inflatable safety crash bag or confinement that provides protection for vehicle passengers and is especially suited for aircraft, automobiles, speedboats, and other vehicles which travel on land, sea, or in the air, so that the occupant thereof is protected from rapid or violent deceleration of the vehicle in which he is riding. More particularly, the present invention relates to a collision sensor and electrical system for actuating the confinement.

As disclosed in application Ser. No. 562,289, a rapidly inflatable confinement or crash bag serves as an occupant restraint and is automatically inflated by a high-pressure gas which is released by an inertia responsive mechanism upon sensing rapid vehicle deceleration. The gas causes the inflatable confinement to be inflated within a few milliseconds. This rapid inflation of the confinement effectively restrains forward movement of a vehicle passenger when subjected to the rapid deceleration of an accidental stop, whereby the passenger is prevented from coming into abrupt forceful contact with structure of the vehicle.

An object of this invention is to provide a vehicle safety apparatus including a new and improved collision-sensing means for closing a switch upon the occurrence of a collision to thereby energize a circuit for activating means for inflating a confinement which restrains movement of an occupant of the vehicle during a collision.

Another object of this invention is to provide a new and improved sensor assembly for sensing the occurrence of a collision and effecting the operation of a vehicle safety apparatus to restrain movement of an occupant of the vehicle during the collision and wherein the sensor assembly comprises a housing defining a chamber in which a body or mass is slidably mounted for forward movement against a spring under the influence of collision forces to complete an electrical circuit which effects the operation of the vehicle safety apparatus.

In order for an inflatable confinement to substantially reduce injury to a vehicle passenger subjected to a sudden impact or rapid deceleration as the vehicle is traveling 30 m.p.h., the inflatable confinement must be fully inflated within a time range of from 40 to 60 m.secs. Tests have shown it takes 130 m.secs. for a person's body to collide with the instrument panel or windshield of a conventional vehicle when the vehicle, traveling 30 m.p.h., collides with a stationary barrier. These tests have shown a passenger's body will move forward 4 to 6 inches relative to the passenger compartment in (the time allowed) 40 to 60 m.secs. for expansion of the inflatable crash container. Thus, it is apparent the inflatable crash container must be fully inflated at the end of 60 m.secs. after sensing of a sudden deceleration by an inertia mechanism operatively connected to a source of pressurized fluid which inflates the crash container.

Other objects and purposes of this invention will be apparent upon reading the following specification in conjunction with the accompanying drawing, in which:

FIG. 1 is a plan view of a vehicle compartment showing the inflatable crash bag of the present invention and the relationship between a vehicle occupant and the inflated bag;

FIG. 2 is a diagrammatic view showing a detailed cross section of the inertia responsive device electrically connected to an explosive charge disposed in a high-pressure fluid container;

FIG. 3 is a fragmentary sectional view of the inertia-responsive switch mechanism in a closed or energizing position;

FIG. 4 is a cross section of the explosive charge employed in the present invention.

Certain terminology will be used in the following description for convenience in reference only and will not be limiting. The words "upwardly," "downwardly," "rightwardly" and "leftwardly" will designate directions in the drawings to which reference is made. The words "forwardly" and "rearwardly" will refer to the normal forward and reverse direction of travel of the vehicle to which the safety mechanism is attached. The words "inwardly" and "outwardly" will refer to directions toward and away from, respectively, the geometric center of the device and designated parts thereof. Said terminology will include the words specifically mentioned, derivatives thereof and words of similar import.

Referring in greater detail to the drawings wherein like numerals indicate similar parts throughout the several views, reference number 10 of FIG. 1 discloses the inflatable confinement or crash bag assembly which includes an inflatable thermoplastic polymer crash bag or container 12 made of polyvinyl chloride, polyethylene or some other thermoplastic polymer composition or a ductile material having a high degree of plasticity which exhibits a high percent of elongation and low-tensile strength when subjected to loading in tension. Such a thermoplastic polymer bag will be irreversibly deformed without rupture when a vehicle occupant is thrown against the inflated bag as a result of a rapid deceleration and thus minimize rebound of the occupant. It is well known, physical properties such as hardness, modulus, flexibility, and rigidity of the thermoplastic polymer composition can be controlled by the amount of plasticizer or other compounding ingredients utilized therewith.

The inflatable crash bag 12 may completely enclose or only partially surround a diffuser member or first outer container 14 which has a plurality of fluid discharge openings 16, as shown in FIG. 2, so constructed and arranged to direct fluid flow therethrough into the interior of the bag 12. A plurality of bands or clamps 17 may releasably secure the crash bag 12 about outer container 14.

A fluid reservoir or an inner container 18 has flange portions which are deformed or swaged radially outwardly for frictionally contacting the interior wall surface 22 of outer container 14, thus the outer surface 24 of container 18 is spaced from the inner surface 22 of container 14, thereby creating a first fluid flow path therebetween. A reduced cross section is provided in the wall of the container 18 to form a stress riser. A stress riser being defined as a structure having a notch or any abrupt change in cross section, whereby the maximum stress will occur at this change in cross section and this maximum stress will be greater than the stress calculated by elementary formulas based upon simplified assumptions as to the stress distribution.

The stress riser (not shown) extends substantially along the entire longitudinal length of container 18 and is generally parallel to the geometric axis thereof. The manner of producing a stress riser may be accomplished by numerous well-known and conventional means; for example, forming a groove on the surface of container 18, welding two ends of a metal plate which form container 18 together utilizing a weld metal having a lower tensile strength than the parent metal or by brazing, etc.

An explosive means in the form of an explosive charge 30 is generally positioned centrally within container 18 by a plurality of spider support elements 32 with each element 32 having a centrally disposed hub 34 including a bore for slidably receiving and frictionally engaging the outer surface of explosive charge 30. A plurality of tab elements 38 extend radially outwardly from hub 34 and frictionally contact the inner surface of container 18 to centrally position the explosive charge 30. It is readily apparent other means of positioning the explosive charge may be utilized without departing from the scope of the present invention.

Dished heads 42 are inserted in opposite ends of container 14 and are seamwelded to provide a fluidtight seal between heads 42 and inner container 18. A suitable plug (not shown) is provided to enable the container 18 to be charged with a high-pressure relatively inert fluid; for example, nitrogen, air, carbon dioxide, or some relatively inert gas mixture which is compatible to human beings. The dished head 42 (see FIG. 2) contains a feed-through connector 54 having electrical wires 56 and 58 extending therethrough and connecting the explosive charge 30 to a source of electrical energy; in this case, the battery of the vehicle. A fluid seal 60 contains a plurality of holes for receiving and supporting wires 56 and 58 in addition to providing a fluid seal between the wires and dished head 42.

An inertia responsive device 62, as shown in FIG. 2 has a housing 64 divided by wall 66 into chambers 68 and 70. Chamber 68 has an enlarged portion 72 of greater cross-sectional area than the remaining portion 74 of chamber 68. The enlarged chamber portion 72 is located adjacent removable cover 76 which is removably secured to housing 64 by a plurality of threaded studs or screws 78. The removable cover 76 closes one end of chamber 68 and has a recess 80 in axial alignment with and having the same cross-sectional area and configuration as chamber portion 68. An inertia mass or weight 82 is reciprocably disposed within the enlarged portion 72 for movement in one or another direction. A plurality of stop or abutment surfaces 84 and 86 formed by the surface areas which interconnect the differential cross sectional areas created by chamber 68, 74 and 80, limit the longitudinal movement of the inertia mass element 82. The inertia mass 82 has an elongated body with a bore 88 extending generally therethrough and having its geometric axis aligned with chamber portions 68, 70 and 80. An enlarged recess 90 located on one end 92, of inertia mass 82 has a greater cross sectional area than bore 88 and possesses a relatively flat bottom wall 94 which intersects bore 88. A portion of the remaining surface area 93 of one end 92 abuts surface 84 whenever the mass 82 moves its complete longitudinal extent in said one direction and a portion of surface area 95 on the opposite end 96 of mass 82 abuts surface 86 when the mass 82 moves its complete longitudinal extent in another direction.

A spring retainer 98 is disposed in chamber 68 and is adjustably positioned therein by setscrew 100 which threadedly engages housing 64 and is secured in position by a locknut 102. This adjustment feature is neither essential or required in the present device; inasmuch as a spring 104 could be designed to have the proper deflection rate and could completely fill chamber portion 68. The spring or biasing member 104 has one end 106 bearing against spring retainer 98 while the opposite end 108 bears against bottom wall 94 to bias surface area 95 of inertia mass 82 into abutting engagement with surface 86.

An annular recess 110, as shown in FIGS. 2 and 3, located adjacent opposite end 96 interrupts the outer surface 112 of inertia mass 82 and a cam surface 114 located on outer surface 112, extends from the inner edge 116 of the recess 110 toward one end 92. The dividing wall portion 66 has a hole 118 containing a cam follower 120 having an end surface 122 extending therethrough for contacting cam surface 114. An electrical switch 124 including two resilient leaf members 126 and 128 have at least two opposed contact surfaces 130 and 132 connected respectively thereto. A plurality of bolts 134 threadedly connect switch 124 to wall portion 66 thereby providing an anchor for members 126 and 128. A plurality of insulating and spacing elements are provided to electrically insulate members 126 and 128 from each other respectively, and the wall portion 66 and bolts 134. The leaf member 128 has a portion 136 extending beyond contact 132 for contacting the other end surface 138 of cam follower 120. Since cam follower 120 is slightly longer than would be required for a normal contacting or switch-closing relationship between opposed contacts 130 and 132, the electrical switch 124 is in the normally opened position when surface 122 or cam follower 120 is engaging cam surface 114.

Electrical wires 58 and 140 extend through respective openings 142 and 144 in a sidewall of chamber 70, in sealed relationship therewith. One end of wire 140 is connected to a source of electrical energy; for example, the battery 146 of a vehicle, with the opposite end being connected to electrical switch leaf member 126 and wire 58 is connected to electrical switch leaf member 128, with the opposite end thereof being connected to leg wire 148 of explosive charge 30.

The explosive charge shown in FIG. 4 includes two leg wires 148 and 150 interconnected by a bridge wire 152 which acts as an electrical resistance to the flow of electric current therethrough, to produce sufficient heat in response to a predetermined current, to ignite the ignition mix 154 which subsequently fires the primer charge 156, thereby exploding the base charge 158. A metal jacket 160 partially encloses the above-mentioned components to form explosive charge 30 and a rubber plug 162 acts as a closure for open end 164 of the metal jacket 160 and additionally supports and insulates leg wires 148 and 150 from metal jacket 160. The wire 56 electrically interconnects electrical explosive leg wire 150 to ground thereby completing the electric circuit. Both electric wires 56 and 58 are electrically shielded from any external magnetic field created by an outside source; for example, a radio transmitter. The purpose of this electromagnetic shield is to prevent premature or impromptu detonation of the explosive charge 30.

In the operation of this safety device, the inertia device 62 is mounted on the vehicle in advance of the passenger compartment. It is obvious when the vehicle encounters rapid or violent deceleration the potential energy retained by the inertia weight 82, in response to the linear speed of the vehicle, will be converted into kinetic energy and weight 82 will overcome the resistance of spring 104 and move forwardly until a portion of surface 93 contacts stop 84. With the weight 82 in its forward position, the end surface 122 of cam follower 120 completely clears corner 116 of cam surface 114. Accordingly, resilient leaf portion 136 biases cam follower 120 upwardly into annular recess 110 as shown in FIG. 3, and simultaneously brings contacts 130 and 132 together to close the normally open switch 124, thereby energizing the electric circuit connecting battery 146 to explosive charge 30. The purpose of annular recess 110 and cam follower 120 is to prevent instantaneous rebound or rearward movement of weight 82 upon impact with stop 84. Therefore, in the present invention the rearward movement of weight 82 subsequent to the forward movement thereof is interrupted by the interlocking of cam follower 120 within recess 110. The purpose of which is to assure sufficient electrical current can be built up in the electric circuit to insure positive firing of explosive charge 30. The cam surface 114 may be beveled (not shown) or the surface 122 may be beveled or both surfaces 114 and 122 may be beveled (not shown). By utilizing the beveled surfaces noted above, the inertia weight 82, in its rearward movement would be temporarily delayed or restrained due to frictional surface contact between surfaces 114 and 122. Thus, the switch 124 would be restrained in a closed position for a sufficient length of time to insure positive firing of the explosive charge 30. The detonation of explosive charge 30 produces sonic shock waves with an accompanying instantaneous increase in pressure within inner container 18 for opening inner container 18 along the longitudinally extending stress riser (not shown) and simultaneously outwardly deforming the inner container 18 toward outer container 14. Thus, pressurized fluid flows from the inner container 18 along the flow path created by spaced walls 22 and 24 and is subsequently discharged through aperture 16 into the interior of inflatable bag 12.

From the above description it should be readily apparent that applicants have provided a new and improved inflatable safety crash bag for use by vehicle occupants. It should also be apparent that certain modifications, changes and adaptations may be made in the structure of the disclosed, and it is hereby intended to cover all such modifications, adaptations, and constructions which fall within the scope of the appended claims.

We claim:

1. Safety apparatus for protecting an occupant of a vehicle, said safety apparatus comprising a confinement having a collapsed inoperative condition and an expanded operative condition, said confinement in said expanded operative condition being extended rearwardly from said collapsed inoperative condition so as to restrain forward movement of an occupant under the influence of forces during the collision, a reservoir containing a supply of fluid for expanding said confinement, explosive means operable to provide an opening for flow of fluid from said reservoir, and collision-sensing means for effecting activation of said explosive means upon the occurrence of a collision, said collision-sensing means including a housing defining a chamber having a longitudinal axis extending generally parallel to a longitudinal axis of the vehicle, a body slidably mounted in said chamber for movement along the longitudinal axis of said chamber, spring means located in a forward end portion of said chamber for urging said body toward a rearward end portion of said chamber, electrical circuitry connected to said explosive means for effecting activation of said explosive means upon the occurrence of a collision, contact means located in said housing and forming part of said electrical circuitry connected to said explosive means, said contact means being operated from an open condition to a closed condition in response to movement of said body in a forward direction from said rearward end portion of said chamber toward said forward end portion of said chamber against the urging of said spring means under the influence of collision forces to thereby effect activation of said explosive means upon the occurrence of a collision whereupon said confinement is expanded in a rearwardly direction to restrain forward movement of the occupant during the collision and pin means located in said housing and pressed by said contact means against a side of said body when said body is in the rearward portion of said chamber and said contact means is in the open condition, said pin means being adapted for movement relative to said body under the influence of said contact means upon movement of said body toward the forward portion of said housing to retain said body against movement toward the rearward portion of said chamber under the influence of said spring means.

2. Safety apparatus as defined in claim 1 wherein said electrical circuitry includes means to prevent the induction of an electromotive force by an external magnetic field to prevent premature firing of said explosive means.

3. Safety apparatus as defined in claim 1 wherein said body defines a recess and said pin means engages said recess upon movement of said body toward the forward portion of said housing to thereby retain said body against movement toward the rearward portion of said chamber under the influence of said spring means.

4. In a safety apparatus for protecting an occupant of a vehicle, said safety apparatus comprising a confinement having a collapsed inoperative condition and an expanded operative condition, said confinement in said expanded operative condition being extended rearwardly from said collapsed inoperative condition so as to restrain forward movement of an occupant under the influence of forces during the collision, a reservoir containing a supply of fluid for expanding said confinement, explosive means operable to provide an opening for flow of fluid from said reservoir, and collision-sensing means for effecting activation of said explosive means upon the occurrence of a collision, the improvement wherein said collision-sensing means includes a housing defining first and second chambers, said first chamber having a longitudinal axis extending generally parallel to a longitudinal axis of the vehicle, said first chamber including a rearward portion having a relatively large cross-sectional area, a forward portion having a relatively small cross-sectional area, and an abutment surface extending transversely to the longitudinal axis of said first chamber and located at a forward end of said rearward portion, a body slidably mounted in said rearward portion of said first chamber for movement along the longitudinal axis of said chamber and defining a forwardly opening recess, spring means located in said forward portion of said first chamber and extending into said forwardly opening recess in said body for urging said body toward a rearward end of said first chamber, electrical circuitry connected to said explosive means for effecting activation of said explosive means upon the occurrence of a collision, and contact means located in said second chamber and forming part of said electrical circuitry connected to said explosive means, said contact means being operated from an open condition to a closed condition in response to movement of said body in a forward direction from said rearward end of said first chamber and into engagement with said abutment surface against the urging of said spring means under the influence of collision forces to thereby effect activation of said explosive means upon the occurrence of a collision whereupon said confinement is expanded in a rearwardly direction to restrain forward movement of the occupant during the collision, said body having a passage therethrough to provide fluid communication between opposite ends of said first chamber to thereby tend to minimize resistance to fluid flow through said body upon movement of said body in said first chamber to tend to maximize responsiveness of said collision-sensing means to the occurrence of a collision.

5. Safety apparatus as set forth in claim 4 further including electromagnetic shield means for preventing the induction of an electromotive force in said electrical circuitry by an external magnetic field to prevent premature firing of said explosive means.

6. Safety apparatus for protecting an occupant of a vehicle, said safety apparatus comprising a confinement having a collapsed inoperative condition and an expanded operative condition, said confinement when in said expanded operative condition projecting into a passenger compartment of the vehicle and being effective to restrain movement of an occupant of a vehicle during a collision, a reservoir for containing a supply of fluid for expanding said confinement, explosive means operable to provide an opening for flow of fluid from said reservoir, sensor means mounted in a spaced-apart relationship with said explosive means for detecting the occurrence of a collision, electrical circuitry for operatively interconnecting said sensor means and said explosive means for effecting operation of said explosive means in response to the detection of a collision by said sensor means, said electrical circuitry including at least one electrical conductor extending between said sensor means and said explosive means, and electromagnetic shield means for preventing the induction of an electromotive force in said electrical conductor extending between said sensor means and said explosive means by an external magnetic field to prevent premature firing of said explosive means, said collision-sensing means including a mass movable to effect closing of said sensor, and means for retaining said mass in its sensor-closed position.

7. Safety apparatus for protecting an occupant of a vehicle, said safety apparatus comprising a confinement having a collapsed inoperative condition and an expanded operative condition, said confinement when in said expanded operative condition projecting into a passenger compartment of the vehicle and being effective to restrain movement of an occupant of a vehicle during a collision, a source of fluid for expanding said confinement, explosive means operable to provide for flow of fluid from said source, sensor means mounted in a spaced-apart relationship with said explosive means for detecting the occurrence of a collision, electrical circuitry for operatively interconnecting said sensor means and said explosive means for effecting operation of said explosive means in response to the detection of a collision by said sensor means, said electrical circuitry including at least one electrical conductor extending between said sensor means and said explosive means, and electromagnetic shield means for preventing the induction of an electromotive force in said electrical conductor extending between said sensor means and said explosive means by an external magnetic field to prevent premature firing of said explosive means, said collision-sensing means including a mass movable to effect closing of said sensor, and means for enabling said mass to be maintained in its sensor-closed position until after detonation of the explosive means.